United States Patent [19]

Longfoot

[11] 4,111,438
[45] Sep. 5, 1978

[54] SEALING RING ASSEMBLIES FOR PISTONS
[75] Inventor: Gerald Longfoot, Lymington, England
[73] Assignee: Wellworthy Limited, England
[21] Appl. No.: 820,937
[22] Filed: Aug. 1, 1977
[30] Foreign Application Priority Data
  Sep. 2, 1976 [GB] United Kingdom ............... 36492/76
[51] Int. Cl.² .............................. F02F 5/00; F16J 9/00
[52] U.S. Cl. .................................... 277/148; 277/149;
  277/193; 277/198; 277/216; 277/235 A
[58] Field of Search ............... 277/117, 119, 120, 122,
  277/139, 148, 149, 168, 154, 156, 192–195,
  197–199, 216, 218, 220–222, 235 A, DIG. 6

[56] References Cited
U.S. PATENT DOCUMENTS

| 1,251,630 | 1/1918 | Brandum | 277/194 |
| 1,410,727 | 3/1922 | Anthony | 277/194 |
| 1,822,101 | 9/1931 | Lewis | 277/194 |
| 2,905,512 | 9/1959 | Anderson | 277/235 A |
| 3,615,099 | 10/1971 | Prasse | 277/235 A |
| 3,917,290 | 11/1975 | Geffroy | 277/193 X |

FOREIGN PATENT DOCUMENTS

| 794,464 | 12/1935 | France | 277/194 |
| 883,076 | 7/1953 | Fed. Rep. of Germany | 277/193 |
| S32,558 | 5/1956 | Fed. Rep. of Germany | 277/194 |
| 405,844 | 9/1943 | Italy | 277/193 |
| 366,785 | 2/1932 | United Kingdom | 277/193 |
| 412,695 | 7/1934 | United Kingdom | 277/194 |

Primary Examiner—Robert S. Ward, Jr.
Attorney, Agent, or Firm—Biebel, French & Nauman

[57] ABSTRACT

A sealing ring assembly for a piston has an outwardly springing carrier ring and an inwardly springing sealing ring which is located in an outer peripheral recess in the carrier ring. The gaps in the two rings of the assembly are displaced one from the other.

6 Claims, 2 Drawing Figures

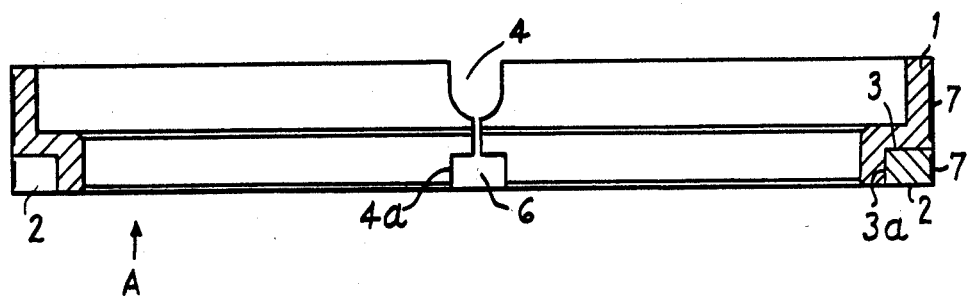
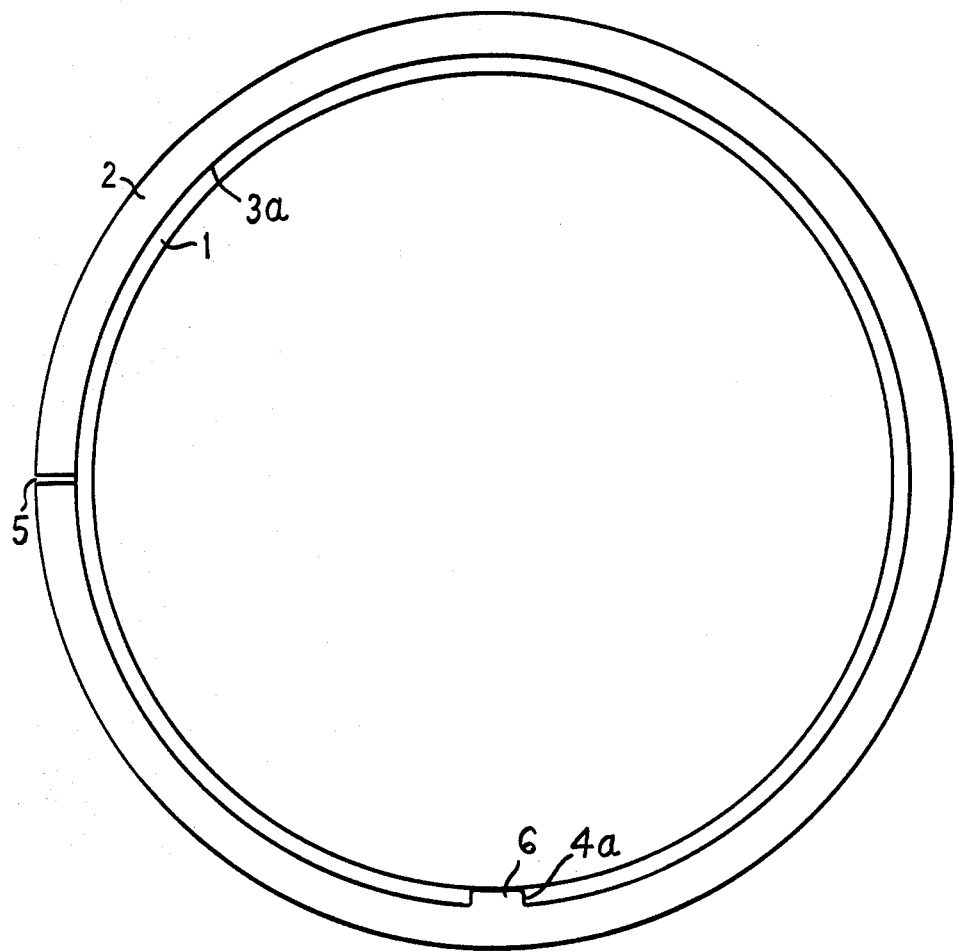

SEALING RING ASSEMBLIES FOR PISTONS

The present invention relates to a sealing ring assembly for a piston, particularly for use in internal combustion engines.

From one aspect the invention provides a sealing ring assembly for a piston comprising an outwardly springing carrier ring and an inwardly springing sealing ring which is located in an outer peripheral recess in said carrier ring, the gaps in the two rings being displaced one from the other.

From another aspect the invention provides the combination of a piston located in a cylinder and a sealing ring assembly located in a ring groove of said piston, said assembly comprising an outwardly springing carrier ring and an inwardly springing sealing ring located in an outer peripheral recess in said carrier ring with the gaps in the two rings displaced one from the other, and wherein the outer surface of said sealing ring is held against the cylinder bore by the outward pressure of a wall of said recess acting against the inner peripheral surface of said sealing ring. To ensure that this pressure is maintained at all times, the peripheries of the carrier and sealing rings are machined at one operation with the rings assembled together and held in the closed position. The inspringing character of the sealing ring ensures that there is no clearance between the inner face of the sealing ring and the outward facing wall of the recess in the carrier ring. This machining operation ensures that the radial depth of the sealing ring is made identical to the radial depth of the recess.

Advantageously, the sealing ring is of rectangular cross-section and fits within a recess of similar shape provided in the outer peripheral face and one side face of the carrier ring, preferably at that face corresponding with the lower face of the carrier ring when the ring assembly is fitted to a piston.

The adjacent side faces of the carrier ring and sealing ring are preferably machined after the two rings have been assembled, so that the sealing ring fits precisely between the abutting side face of the ring groove in a piston and the upper face of the said recess in the carrier ring.

In order to maintain the gaps in the two rings displaced from one another, the sealing ring is preferably positively located against rotation with respect to the carrier ring. To this end the sealing ring may be provided with an inwardly projecting lug which fits in a part of the gap in the carrier ring.

The invention will now be further described, by way of example, with reference to the accompanying drawings, in which:

FIG. 1 is a cross-sectional view of one embodiment of sealing ring assembly according to the invention, and FIG. 2 is a plan view in the direction of the arrow A in FIG. 1.

Referring to the drawings, the sealing ring assembly comprises an outwardly springing carrier ring generally indicated at 1 and an inwardly springing sealing ring generally indicated at 2. The sealing ring is of rectangular cross-section and is located in a correspondingly shaped recess 3 provided in the outer peripheral face and one said face of the carrier ring. The carrier ring is provided with a gap 4 and the sealing ring is provided with a gap 5. The sealing ring 2 also has an inwardly projecting lug 6 which fits in the portion 4a of the gap 4 in the carrier ring to maintain the ring gaps 4 and 5 displaced by about 90° and prevent relative rotation of the rings. The outer peripheral surface of both the carrier ring 1 and the sealing ring 2 may be provided with a wear-resistant coating, e.g. of molybdenum, as indicated at 7.

The sealing ring is fitted into the recess in the carrier ring with the ring gaps displaced as described, and the adjacent side faces (i.e. the lowermost faces in FIG. 1) of the sealing ring and carrier ring are machined level. The ring assembly is then held in the closed position and the sealing ring by virtue of its in-springing character, remains in firm contact with the back wall 3a of the recess while the peripheries of both the carrier ring and the sealing ring are machined flush in a single operation, so that the radial depth of the sealing ring and of the recess become identical. The result of this is that the sealing ring has no side or back clearance with respect to the carrier ring.

When fitted in an engine, the sealing ring 2 is held against the cylinder surface by the outwardly acting physical pressure of the back wall 3a of the recess but, due to the inwardly springing nature of the sealing ring, there is no tendency for any part of the sealing ring 2 to spring outwardly away from the carrier ring 1.

A sealing ring assembly according to this invention may in particular be employed as a fire ring, sometimes known as a port sealing ring, on pistons for two-stroke engines. Since there is no tendency for any part of the sealing ring to spring outwards away from the carrier ring, there is no risk of fouling when the ring assembly passes over inlet or exhaust ports and ring breakage from this cause is thereby eliminated, even when the ring assembly is free to rotate in the piston ring groove. Moreover, the absence of back clearance between the sealing ring and the carrier ring means that even when the ends of the carrier ring pass over a port in the cylinder wall, they are restrained from springing outwards by the sealing ring which forms a bridge over the port. In this way, damage to the ends of the carrier ring is also prevented.

Furthermore, the fact that the abutting peripheral faces of the sealing ring and the carrier ring are urged towards each other in the recess, coupled with the fact that the gaps are displaced from each other, virtually eliminates the possibility of any gas leakage through the ring assembly.

What is claimed is:

1. A sealing ring assembly for a piston comprising:
an outwardly springing carrier ring having a gap,
a recess disposed in the outer peripheral surface of the carrier ring,
an inwardly springing sealing ring having a gap,
the outwardly springing character of the carrier ring being stronger than the inwardly springing character of the sealing ring,
said inwardly springing sealing ring being located in the outer peripheral recess in said outwardly springing carrier ring and said gaps in the two rings being displaced one from the other.

2. An assembly according to claim 1, wherein the sealing ring is of rectangular cross-section and said recess in the carrier ring is provided in the outer peripheral face and one side face thereof and is of rectangular cross-section dimensionally identical to the sealing ring.

3. An assembly according to claim 2, wherein said one face is the face of the carrier ring which is directed away from the piston crown when the ring assembly is fitted to piston.

4. An assembly according to claim 1, wherein a wear-resistant coating is provided on the outer peripheral surfaces of the carrier ring and the sealing ring.

5. The combination comprising
a piston, at least one ring groove being provided in the circumferential wall of the piston,
a cylinder in which the piston is located, and
a sealing ring assembly according to claim 2 located in said at least one ring groove, so that the peripheral surfaces of the sealing ring and carrier ring are held in contact with the cylinder bore surface by the stronger outwardly springing carrier ring.

6. An assembly according to claim 1, including means which positively locate the sealing ring against rotation with respect to the carrier ring in order to maintain the gaps in the two rings displaced from one another, said positive locating means comprising a radially inwardly projecting lug provided on the sealing ring, said lug fitting in a part of the gap of the carrier ring.

* * * * *

UNITED STATES PATENT AND TRADEMARK OFFICE
CERTIFICATE OF CORRECTION

PATENT NO. : 4,111,438
DATED : September 5, 1978
INVENTOR(S) : Gerald Longfoot

It is certified that error appears in the above—identified patent and that said Letters Patent are hereby corrected as shown below:

Column 1, line 64, "said" should be --side--.

Column 2, line 44, after "the" insert --ring --.

Claim 3, line 66, after "one" insert --side--; line 68, after "to" insert --a--.

Signed and Sealed this

Twenty-fourth Day of April 1979

[SEAL]

Attest:

RUTH C. MASON
Attesting Officer

DONALD W. BANNER
Commissioner of Patents and Trademarks